US008824160B2

(12) United States Patent
Lee et al.

(10) Patent No.: US 8,824,160 B2
(45) Date of Patent: Sep. 2, 2014

(54) COVER GLASS STRUCTURE AND FABRICATION METHOD THEREOF AND TOUCH-SENSITIVE DISPLAY DEVICE

(75) Inventors: Chia-Huang Lee, Taichung County (TW); Ming-Kung Wu, Taichung County (TW); Heng Chia Kuo, Taichung County (TW)

(73) Assignees: Wintek Technology (H.K.) Ltd., Dongguan, Guangdong Province (CN); Wintek Corporation, Taichung (TW)

(*) Notice: Subject to any disclaimer, the term of this patent is extended or adjusted under 35 U.S.C. 154(b) by 51 days.

(21) Appl. No.: 13/309,239

(22) Filed: Dec. 1, 2011

(65) Prior Publication Data
US 2012/0140392 A1 Jun. 7, 2012

(30) Foreign Application Priority Data
Dec. 6, 2010 (TW) ................. 99142291 A (51) Int. Cl.
*H05K 7/00* (2006.01)
(52) U.S. Cl.
USPC ............. 361/760; 361/679.01; 361/679.02; 361/679.03; 361/679.04

(58) Field of Classification Search
USPC ................. 361/760, 679.01–679.04
See application file for complete search history.

(56) References Cited

U.S. PATENT DOCUMENTS

| 2010/0265187 | A1* | 10/2010 | Chang et al. ............... 345/173 |
| 2011/0080373 | A1* | 4/2011 | Wang et al. ............... 345/174 |
| 2011/0177290 | A1 | 7/2011 | Tomamoto et al. |

FOREIGN PATENT DOCUMENTS

| KR | 10-0954894 B1 | 4/2010 |
| TW | 200500693 | 1/2005 |
| TW | 201022164 A1 | 6/2010 |

* cited by examiner

*Primary Examiner* — Andargie M Aychillhum
(74) *Attorney, Agent, or Firm* — Muncy, Geissler, Olds & Lowe, P.C.

(57) ABSTRACT

A cover glass structure includes a glass substrate, a touch-sensing structure and a decorative layer. The glass substrate has at least one cutting section, and the cutting section is polished to form a polished surface. The touch-sensing structure is disposed on the glass substrate, and the decorative layer is disposed on the glass substrate.

11 Claims, 9 Drawing Sheets

FIG. 9 ns, a
display device having the cover glass structure.
b. Description of the Related Art

COVER GLASS STRUCTURE AND FABRICATION METHOD THEREOF AND TOUCH-SENSITIVE DISPLAY DEVICE

BACKGROUND OF THE INVENTION a. Field of the Invention

The invention relates to a cover glass structure, a fabrication method of the cover glass structure, and a touch-sensitive display device having the cover glass structure.

b. Description of the Related Art

Figure 1:
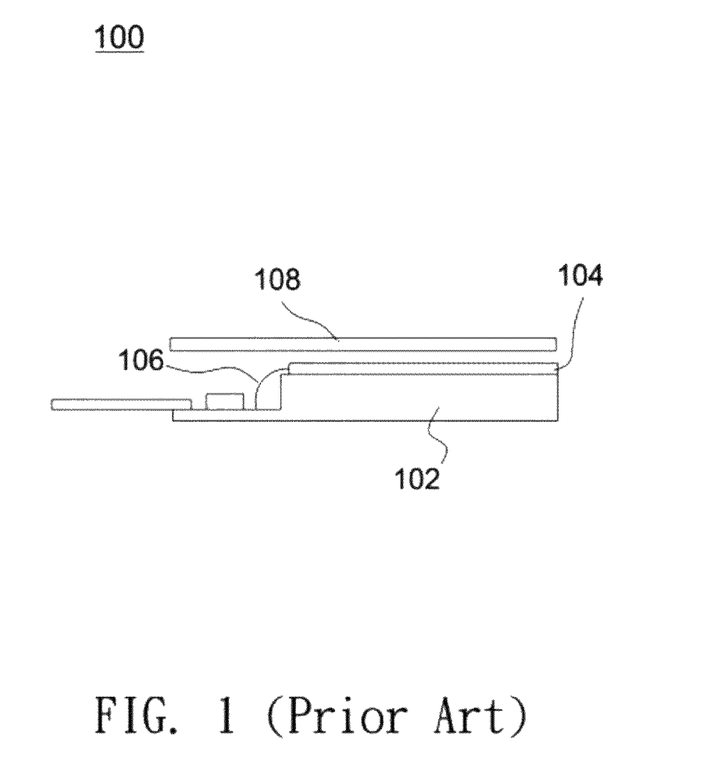
FIG. 1 shows a cross-sectional schematic diagram of a conventional touch panel.

FIG. 1 shows a schematic diagram of a conventional touch-sensitive display device. Referring to FIG. 1, a touch panel 104 is embedded in a display panel 102. Multiple signal lines of the touch panel 104 are electrically connected to the display panel 102 through a flexible printed circuit board 106, and a cover glass 108 covers the touch panel 104. In the conventional touch-sensitive display device 100, the touch panel 104 typically includes a single-layer glass substrate or a double-layer glass substrate, and together with a cover glass covering the touch panel 104. As a result, the entire glass thickness is sufficient to prevent the impact of external forces. However, a new generation of touch panels adopts a single-glass-substrate design that omits the cover glass 108 disposed at the top of a touch panel. Under the circumstance, when machining processes like cutting, edging and chamfering are performed on a single glass substrate, a large amount of tiny cracks are formed on the periphery of the glass substrate to considerably reduce the glass strength. Therefore, when the glass substrate is bent or warped, the glass substrate is liable to break through the peripheral cracks and into the inside thereof.

BRIEF SUMMARY OF THE INVENTION

The invention provides a cover glass structure, a fabrication method of the cover glass structure, and a touch-sensitive display device having the cover glass structure.

In order to achieve one or a portion of or all of the objects or other objects, one embodiment of the invention provides a cover glass structure including a glass substrate, a touch-sensing structure and a decorative layer. The glass substrate has at least one cutting section, and the cutting section is polished to form a polished surface. The touch-sensing structure is disposed on the glass substrate, and the decorative layer is disposed on the glass substrate.

In one embodiment, the decorative layer is disposed on the periphery of the glass substrate, and the material of the decorative layer includes at least one of diamond-like carbon, ceramic, colored ink, resin and photo resist.

In one embodiment, at least one functional film is disposed on at least one side of the glass substrate, and the functional film includes at least one of a polarizing sheet, an optical filter, an anti-glare film, an anti-reflection film, a polyethylene terephthala film and a hard coat film.

In one embodiment, the touch-sensing structure includes a plurality of first sensing series and a plurality of second sensing series respectively formed on two opposite sides of the glass substrate.

According to another embodiment of the invention, a fabrication method of a cover glass structure including the steps of: forming a touch-sensing structure and a decorative layer on a glass substrate; performing machining processes on the glass substrate; and polishing the periphery of the machined glass substrate to eliminate cracks formed on the periphery of the machined glass substrate.

According to another embodiment of the invention, a touch-sensitive display device includes a display panel and a cover glass structure attached to the display panel. The cover glass structure includes a glass substrate, a touch-sensing structure and a decorative layer. The glass substrate has at least one cutting section, and the cutting section is polished to form a polished surface. The touch-sensing structure is disposed on the glass substrate, and the decorative layer is disposed on the glass substrate.

According to the above embodiments, when a cutting section of a machined glass substrate is subject to surface polishing, tiny cracks caused by machining processes and formed on the cutting section are removed to result in a smooth surface. Therefore, when the machined glass substrate is bent or warped, the possibility of breaking through the periphery cracks is considerably reduced to increase averaged strength and B10 testing strength of the machined glass substrate. Further, since the cutting section of a machined glass substrate is polished to increase its strength, a thinner glass substrate may be used instead to still achieve competent glass strength.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front" "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
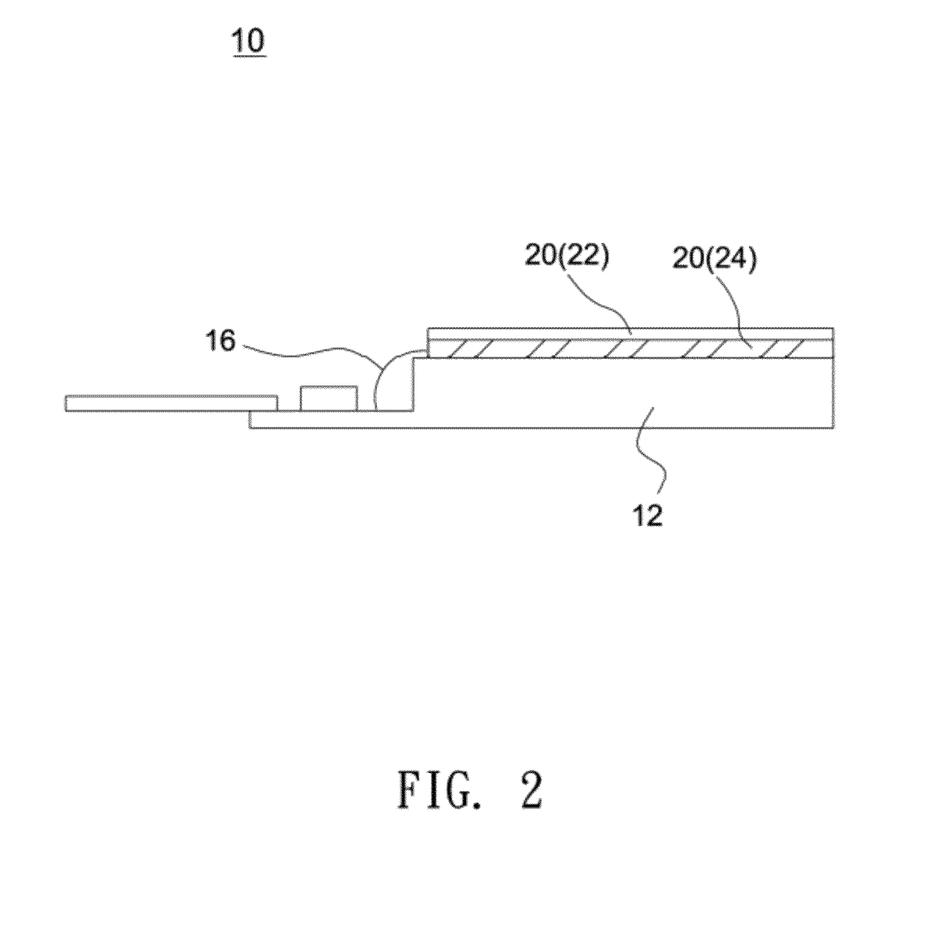
FIG. 2 shows a schematic diagram of a touch-sensitive display device according to an embodiment of the invention.

FIG. 2 shows a schematic diagram of a touch-sensitive display device according to an embodiment of the invention. Referring to FIG. 2, the touch-sensitive display device 10 includes a display panel 12 and a cover glass structure 20 attached to the display panel 12. Signal lines of the cover glass structure 20 are electrically connected to the display panel 12 through a flexible printed circuit board 16. In this embodiment, the cover glass structure 20 includes a single-layer glass substrate 22 and a touch-sensing structure 24 disposed on the glass substrate 22. The touch-sensing structure 24 may detect different touch operations, and the glass substrate 22 may be a raw glass substrate without being strengthened or a reinforced glass substrate. In typical glass machining processes, a large glass sheet is subject to cutting, edging, chamfering, etc to form the single-layer glass substrate 22 shown in FIG. 2. However, after the machining processes are performed, a large amount of tiny cracks are often formed on the periphery of the glass substrate 22 to considerably reduce the strength of the glass substrate 22. When the glass substrate 22 is bent or warped, the glass substrate 22 is liable to break through the peripheral cracks to the inside thereof. In this embodiment, the peripheral cracks formed on the glass substrate 22 as a result of cutting, edging and chamfering operations are removed by polishing to increase the strength of a machined glass substrate.

Figure 3:
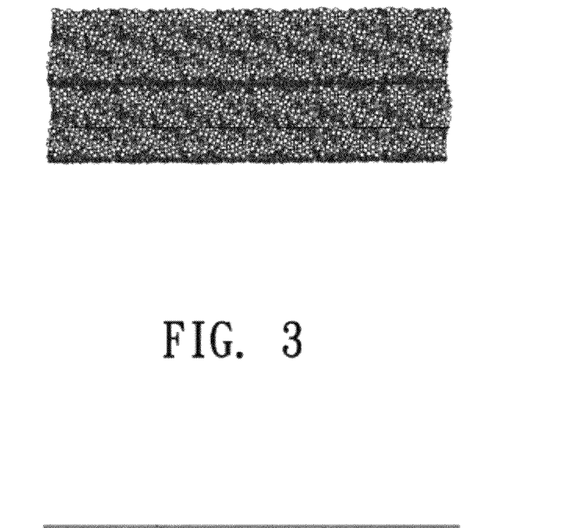
FIG. 3 shows an enlarged schematic diagram illustrating a partial cutting section of a machined glass substrate without being polished.
Figure 4:
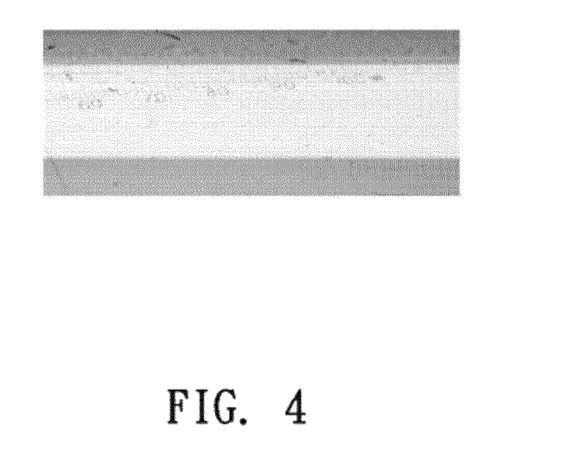
FIG. 4 shows an enlarged schematic diagram illustrating a partial cutting section of a polished glass substrate.

FIG. 3 shows an enlarged schematic diagram illustrating a partial cutting section of a machined glass substrate without being polished. FIG. 4 shows an enlarged schematic diagram illustrating a partial cutting section of a machined glass substrate subject to surface polishing. As shown in FIG. 3 and FIG. 4, when a cutting section of a machined glass substrate is subject to surface polishing, tiny cracks formed on the cutting section are removed to result in a smooth surface shown in FIG. 4. Therefore, when the machined glass substrate is bent or warped, the possibility of breaking through the periphery cracks is considerably reduced to increase averaged strength and B10 testing strength of the machined glass substrate. In one embodiment, the surface roughness Ra of a cutting section without being polished is in the range of 1.0-3.0, and the surface roughness Ra of a polished cutting section is smaller than 0.8. According to the above embodiments, since the cutting section of a machined glass substrate is polished to increase its strength, a thinner glass substrate may be used instead to still achieve competent glass strength. Therefore, the entire cover glass structure 20 is allowed to be miniaturized. Note the reinforcement for a single-layer glass substrate of the cover glass structure 20 is merely illustrated as an example. The reinforced glass structure and its fabrication method may be used in different devices and environments. Different embodiments of a reinforced glass substrate serving as a glass substrate of a cover glass structure are described below.

Figure 5A:
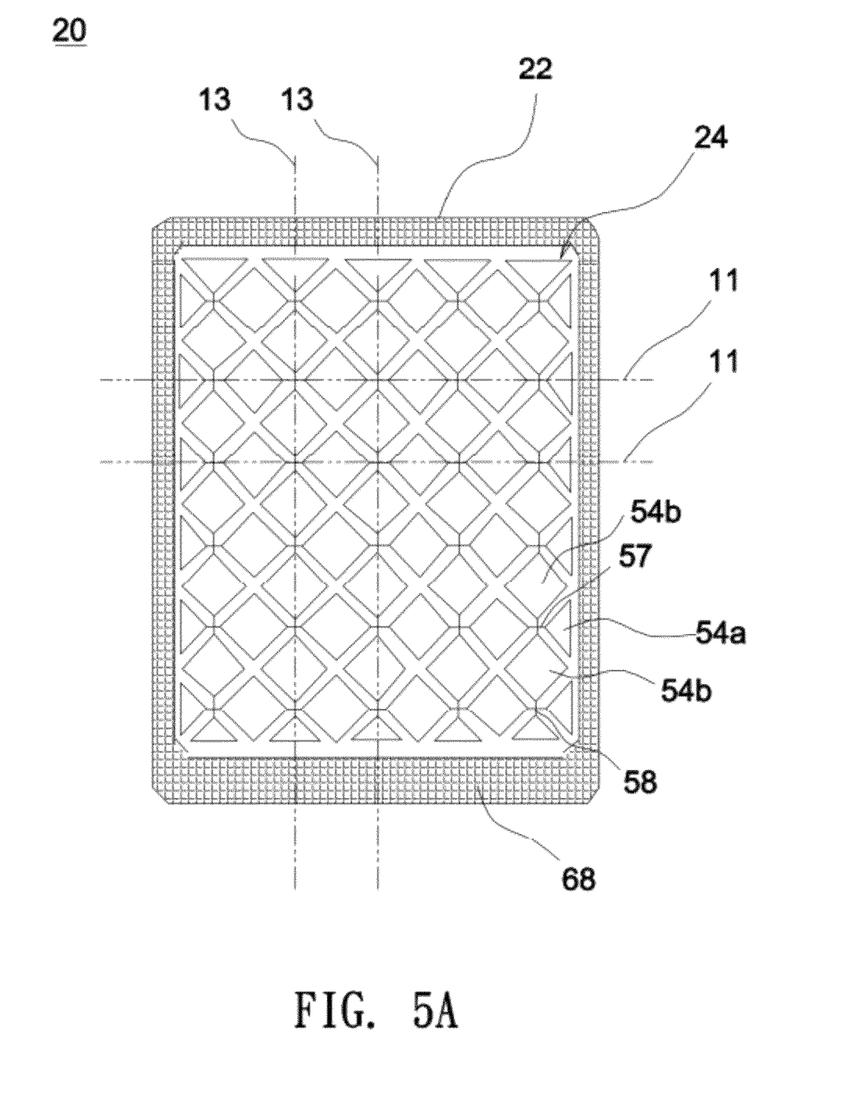
FIG. 5A shows a plan view of a cover glass structure according to an embodiment of the invention
Figure 5B:
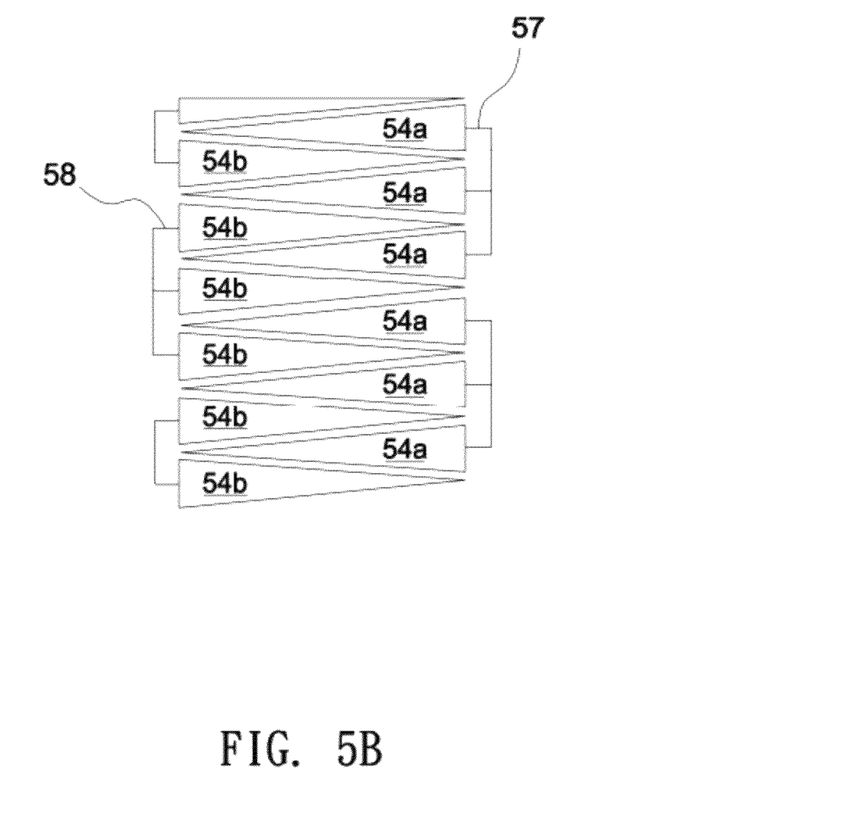
FIG. 5B shows a layout of transparent electrodes according to another embodiment of the invention.

In various embodiments of the invention, as shown in FIG. 5A, a cover glass may be a reinforced glass substrate on which a decorative layer 68 (hatched portions shown in FIG. 5A) is formed. For example, the decorative layer 68 may be disposed on the periphery of the reinforced glass substrate 32 to surround the touch-sensing structure 24 of the cover glass structure 20a or a viewing area of a touch-sensitive display device. The touch-sensing structure 24 may be a single-layer electrode structure or a multi-layer electrode structure. For example, the touch-sensing structure 24 may include a plurality of first sensing series 11 and a plurality of second sensing series 13 spaced apart from the first sensing series 11. Each first sensing series 11 includes multiple first transparent electrodes 54a connected with each other by multiple first connecting lines 57, and each second sensing series 13 includes multiple second transparent electrodes 54b connected with each other by multiple second connecting lines 58. The first transparent electrodes 54a and the second transparent electrodes 54b may be, but not limited to, in the regular shape of a diamond (FIG. 5A), a triangle (FIG. 5B), or a line segment. In an alternate embodiment, the touch-sensing structure 24 may include a plurality of sensing pads that are formed simultaneously, and each of the sensing pads may be in the form of a single layer structure. Each of the sensing pads may be a transparent conductive layer or a metal grid. The shape of each sensing pad includes, but not limited to, a rectangular shape, as long as they can help to achieve touch-sensing operations. Moreover, all sensing pads are not needed to have an identical shape.

Figure 6A:
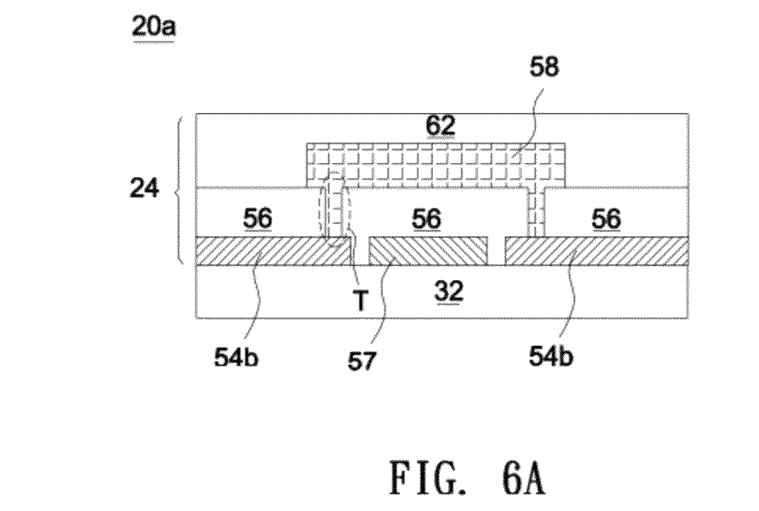
FIG. 6A shows a partial cross-section of a cover glass structure according to an embodiment of the invention.

As shown in FIG. 6A, a cover glass structure 20a includes a reinforced glass substrate 32 and a touch-sensing structure 24 formed on the reinforced glass substrate 32. The reinforced glass substrate 32 is formed by polishing a machined glass substrate. Referring to FIG. 5A and FIG. 6A, in this embodiment, a plurality of first sensing series 11 (including multiple first transparent electrodes 54a and first connecting lines 57) are disposed on the reinforced glass substrate 32 and distributed along an X-axis direction at an equal distance and parallel to each other, and multiple second transparent electrodes 54b are disposed on the reinforced glass substrate 32 and distributed along a Y-axis direction at an equal distance and parallel to each other. An insulation layer 56 covers the first sensing series 11 and the second transparent electrodes 54b and is provided with a plurality of via holes T to expose a part of the second transparent electrodes 54b. The two ends of the second connecting line 58 are electrically connected with different second transparent electrodes 54b separately through the via holes T. A passivation layer 62 covers the first sensing series 11, the second sensing series 13, and the insulation layer 56.

Figure 6B:
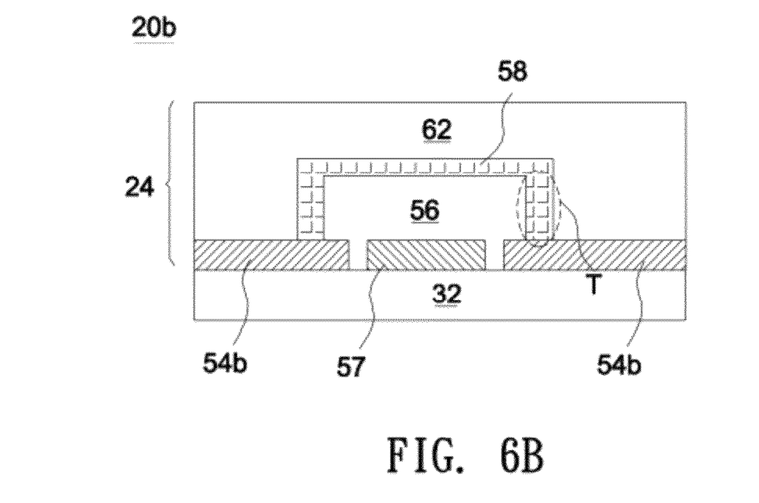
FIG. 6B shows a partial cross-section of a cover glass structure according to another embodiment of the invention.

As shown in FIG. 6B, a cover glass structure 20b includes a reinforced glass substrate 32 and a touch-sensing structure 24 formed on the reinforced glass substrate 32. The reinforced glass substrate 32 is formed by polishing a machined glass substrate. In this embodiment, a plurality of first sensing series 11 (including multiple first transparent electrodes 54a and first connecting lines 57) are disposed on the reinforced glass substrate 32 and distributed along an X-axis direction at an equal distance and parallel to each other, and multiple second transparent electrodes 54b are disposed on the reinforced glass substrate 32 and distributed along a Y-axis direction at an equal distance and parallel to each other. The insulation layer 56 is in the shape of islands and covers the first connecting lines 57, and the second connecting lines 58 are disposed on the insulation layer 56, where each second connecting line 58 connects two adjacent second transparent electrodes 54b. The passivation layer 62 covers the first sensing series 11, the second sensing series 13, and the insulation layer 56.

Figure 6C:
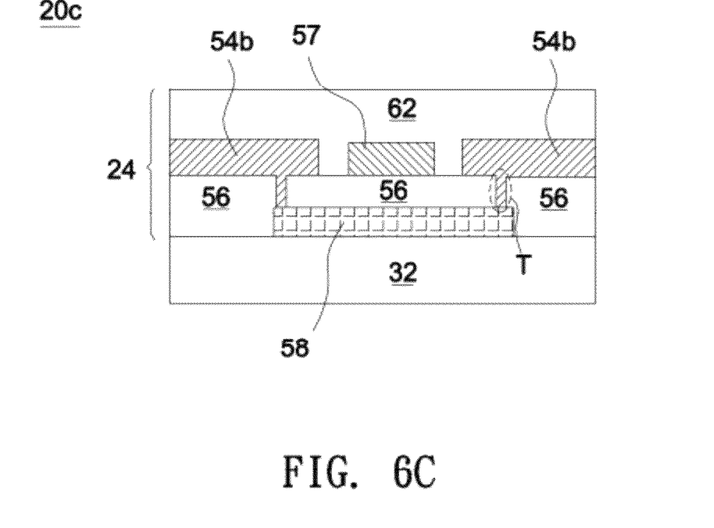
FIG. 6C shows a partial cross-section of a cover glass structure according to another embodiment of the invention.

As shown in FIG. 6C, a cover glass structure 20c includes a reinforced glass substrate 32 and a touch-sensing structure 24 formed on the reinforced glass substrate 32. The reinforced glass substrate 32 is formed by polishing a machined glass substrate. In this embodiment, the second connecting lines 58 are formed on the reinforced glass substrate 32, and the insulation layer 56 are formed on the second connecting lines 58 and the reinforced glass substrate 32. The insulation layer 56 is provided with multiple via holes T, and the first connecting lines 57, the first transparent electrodes 54a, and the second transparent electrodes 54b are formed on the insulation layer 56. Each first connecting line 57 connects two adjacent first transparent electrodes 54a, and each second connecting line 58 connects two adjacent second transparent electrodes 54b through the via holes T.

Figure 6D:
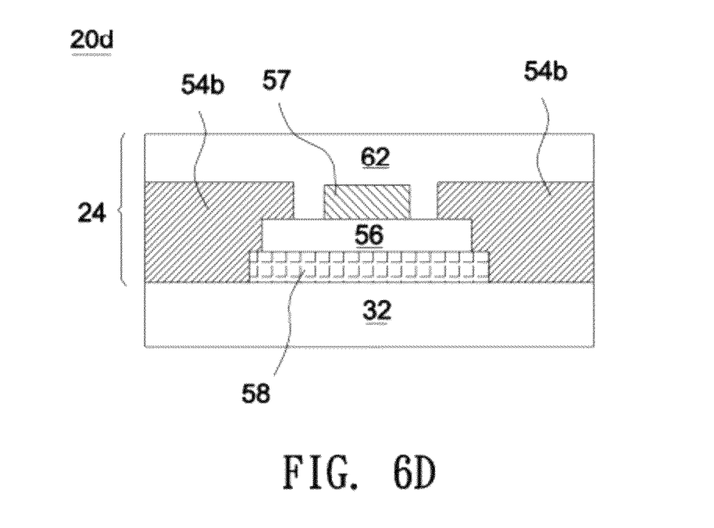
FIG. 6D shows a partial cross-section of a cover glass structure according to another embodiment of the invention.

Referring to FIG. 6D, a cover glass structure 20d includes a reinforced glass substrate 32 and a touch-sensing structure 24 formed on the reinforced glass substrate 32. The reinforced glass substrate 32 is formed by polishing a machined glass substrate. In this embodiment, the second connecting lines 58 are formed on the reinforced glass substrate 32, and the insulation layer 56 is in the shape of islands and covers the first connecting lines 57. A plurality of first sensing series 11 (including multiple first transparent electrodes 54a and first connecting lines 57) are disposed on the reinforced glass substrate 32 and the insulation layer 56 and distributed along an X-axis direction at an equal distance and parallel to each other, and multiple second transparent electrodes 54b are disposed on the reinforced glass substrate 32 and the insulation layer 56 and distributed along a Y-axis direction at an equal distance and parallel to each other.

Figure 7:
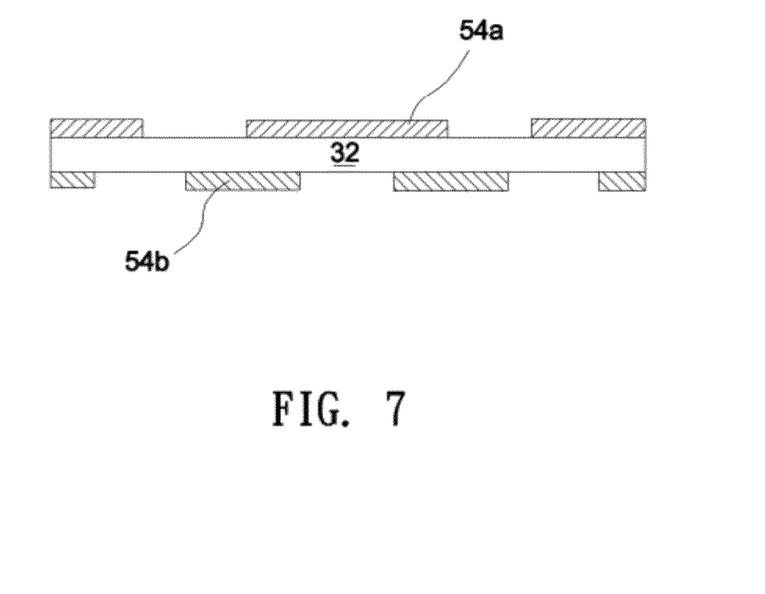
FIG. 7 shows a cross-sectional schematic diagram of a cover glass structure according to another embodiment of the invention.
Figure 8:
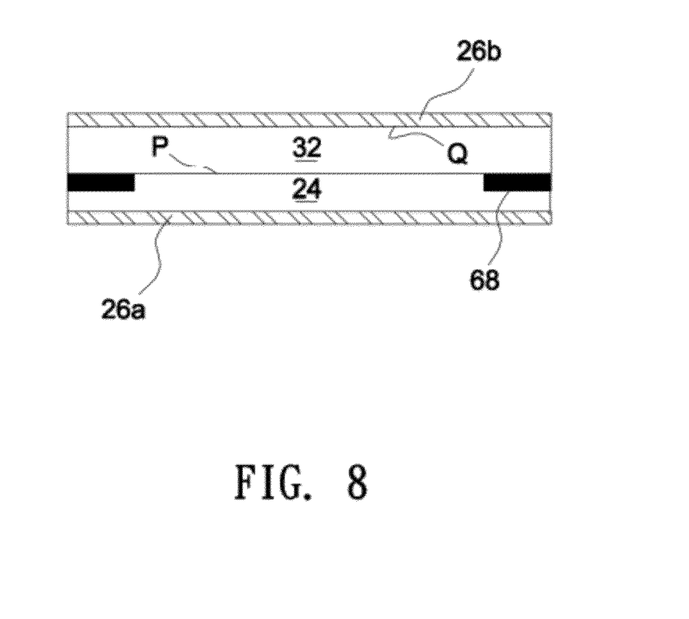
FIG. 8 shows a cross-sectional schematic diagram of a cover glass structure according to another embodiment of the invention.

Note all layers of the touch-sensing structure 24 are not limited to be formed on the same side of the reinforced glass substrate 32. For example, as shown in FIG. 7, multiple first sensing series (including multiple first transparent electrodes 54a) and multiple second sensing serious (including multiple second transparent electrodes 54b) are respectively disposed on two opposite sides of the reinforced glass substrate 32 to form a double-sided ITO (DITO) electrode structure. Further, in an alternate embodiment shown in FIG. 8, the touch-sensing structure 24 is formed on a first side P of the reinforced glass substrate 32, and a functional film 26a may be disposed on the first side P of the reinforced glass substrate 32 (the same side as the touch-sensing structure 24). Further, a functional film 26b may be disposed a second side Q of the reinforced glass substrate 32 opposite the touch-sensing structure 24. For example, the functional film 26a may be an anti-reflection film, a polyethylene terephthalate (PET) film, or a hard coat film. Besides, the functional film 26b may be a polarizing sheet, an optical filter, an anti-glare film, an anti-reflection film, a polyethylene terephthalate film, or a hard coat film.

Figure 9:
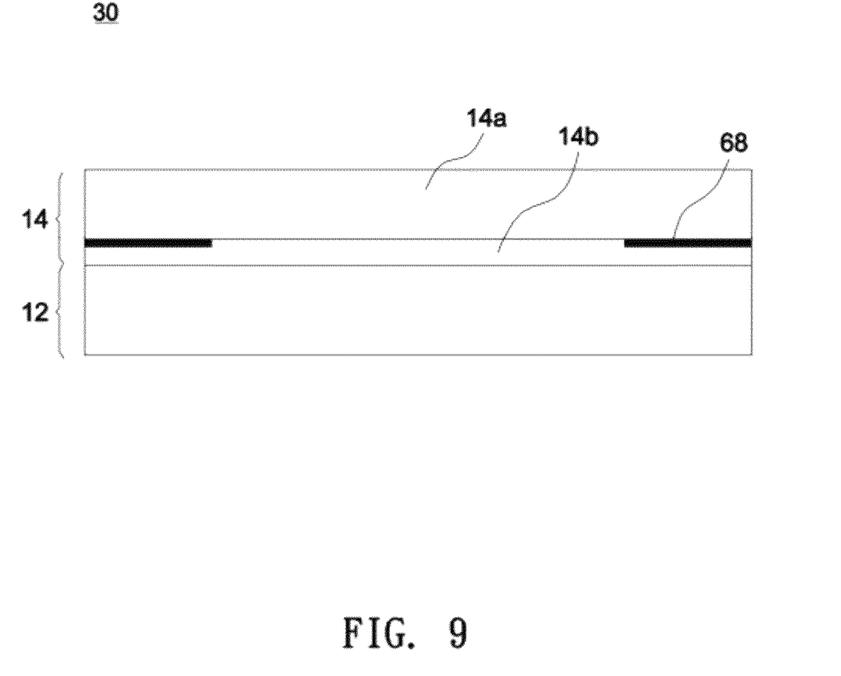
FIG. 9 shows a schematic diagram of a touch-sensitive display device according to another embodiment of the invention.

According to the above embodiments, the material of the decorative layer 68 may include at least one of diamond-like carbon, ceramic, colored ink, resin and photo resist. Further, the reinforced glass structure may serve as a glass substrate of a liquid crystal display, an organic light-emitting diode display, an electro-wetting display, a bi-stable display, an electrophoretic display, a touch panel, an electronic device, etc. For example, a display panel 12 and a touch panel 14 may be combined with each other by an optical adhesive to form a touch-sensitive display device 30, as shown in FIG. 9. The touch panel 14 may include a cover glass 14a and a touch-sensing element 14b formed on the cover glass 14a, and the reinforced glass structure may serve as a glass substrate of the display panel 12 or the touch panel 14.

According to an embodiment of the invention, a fabrication method of a cover glass structure may include the following steps. First, a touch-sensing structure and a decorative layer are formed on a glass substrate, and then machining processes are performed on the glass substrate. The machining processes may include, but not limited to, cutting, edging and chamfering the glass substrate. Thereafter, the periphery of the machined glass substrate (a cutting section) is polished to eliminate tiny cracks formed on the periphery of the machined glass substrate. In one embodiment, in case a machined glass substrate undergoes post treatment like edging or chamfering, a chamfered edge may be formed on a corner of the machined glass substrate, and the surface polishing treatment is also given on the chamfered edge.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure.

What is claimed is:

1. A cover glass structure, comprising:
a glass substrate having at least one cutting section, wherein the cutting section is polished to form a polished surface;

a touch-sensing structure disposed on the glass substrate, wherein the touch-sensing structure comprises a plurality of first sensing series and a plurality of second sensing series spaced apart from the first sensing series, each of the first sensing series comprises a plurality of first transparent electrodes connected with each other by a plurality first connecting lines, and each of the second sensing series comprises a plurality of second transparent electrodes connected with each other by a plurality of second connecting lines; and a decorative layer disposed on the glass substrate.

2. The cover glass structure as claimed in claim 1, wherein the decorative layer is disposed on the periphery of the glass substrate.

3. The cover glass structure as claimed in claim 1, wherein the material of the decorative layer comprises at least one of diamond-like carbon, ceramic, colored ink, resin and photo resist.

4. The cover glass structure as claimed in claim 1, further comprising:
at least one functional film disposed on at least one side of the glass substrate, wherein the functional film comprises at least one of a polarizing sheet, an optical filter, an anti-glare film, an anti-reflection film, a polyethylene terephthala film and a hard coat film.

5. The cover glass structure as claimed in claim 1, further comprising:
a passivation layer formed on one side of the touch-sensing structure opposite the glass substrate.

6. The cover glass structure as claimed in claim 1, wherein the surface roughness of the polished surface is smaller than 0.8.

7. The cover glass structure as claimed in claim 1, wherein the plurality of first sensing series and the plurality of second sensing series are respectively formed on two opposite sides of the glass substrate.

8. A cover glass structure, comprising:
a glass substrate having at least one cutting section, wherein the cutting section is polished to form a polished surface at least one chamfered edge is formed on a corner of the glass substrate, and the polish surface comprises the chamfered edge;
a touch-sensing structure disposed on the glass substrate; and
a decorative layer disposed on the glass substrate.

9. A touch-sensitive display device, comprising:
a display panel; and
a cover glass structure attached to the display panel and comprising:
a glass substrate having at least one cutting section, wherein the cutting section is polished to form a polished surface;
a touch-sensing structure disposed on the glass substrate, wherein the touch-sensing structure comprises a plurality of first sensing series and a plurality of second sensing series spaced apart from the first sensing series, each of the first sensing series comprises a plurality of first transparent electrodes connected with each other by a plurality first connecting lines, and each of the second sensing series comprises a plurality of second transparent electrodes connected with each other by a plurality of second connecting lines; and
a decorative layer disposed on the glass substrate.

10. The touch-sensitive display device as claimed in claim 9, further comprising:
at least one functional film disposed on at least one side of the glass substrate, wherein the functional film comprises at least one of a polarizing sheet, an optical filter, an anti-glare film, an anti-reflection film, a polyethylene terephthala film and a hard coat film.

11. A touch-sensitive display device, comprising:
a display panel; and
a cover glass structure attached to the display panel and comprising:
a glass substrate having at least one cutting section, wherein the cutting section is polished to form a polished surface at least one chamfered edge is formed on a corner of the glass substrate, and the polish surface comprises the chamfered edge;
a touch-sensing structure disposed on the glass substrate; and
a decorative layer disposed on the class substrate.

* * * * *